US006976922B2

(12) United States Patent
Smith

(10) Patent No.: US 6,976,922 B2
(45) Date of Patent: Dec. 20, 2005

(54) PRECISION THRUST BEARING JOINT

(75) Inventor: Johnny N. Smith, Toledo, OH (US)

(73) Assignee: Torque-Traction Techologies, Inc., Maumee, OH (US)

( * ) Notice: Subject to any disclaimer, the term of this patent is extended or adjusted under 35 U.S.C. 154(b) by 40 days.

(21) Appl. No.: 10/414,122

(22) Filed: Apr. 15, 2003

(65) Prior Publication Data

US 2004/0209695 A1 Oct. 21, 2004

(51) Int. Cl.[7] ................................................ F16D 3/41
(52) U.S. Cl. ...................................... 464/136; 464/128
(58) Field of Search ................................ 464/128, 130, 464/132, 136

(56) References Cited

U.S. PATENT DOCUMENTS 698,159 A * 4/1902 Vanderbeek ............ 464/136 X
730,604 A * 6/1903 Brazier
1,180,468 A * 4/1916 Bartlett ....................... 464/136
1,247,290 A * 11/1917 Lehman .................. 464/136 X
1,604,202 A 10/1926 Smith-Clarke
2,024,206 A 12/1935 Buel
3,178,908 A * 4/1965 Stillwagon, Jr. ............ 464/132
3,216,087 A 11/1965 Harrington
3,545,232 A 12/1970 Neese et al.
3,930,381 A * 1/1976 Hall et al. .............. 464/136 X
4,073,162 A * 2/1978 DeBisschop ................ 464/132
4,365,488 A * 12/1982 Mochida et al. ............ 464/132
5,094,651 A * 3/1992 Cornay
5,326,322 A * 7/1994 Fechter ................... 464/136 X
6,139,435 A 10/2000 Cornay

* cited by examiner

*Primary Examiner*—Greg Binda
(74) *Attorney, Agent, or Firm*—MacMillan, Sobanski & Todd, LLC

(57) ABSTRACT

A cross for a universal joint in a vehicle driveshaft assembly is comprised of a hollowed block of material having four openings. The hollowed block holds an inner cross that has a first cross member and a second cross member. Each cross member has an end portion that extends through a thrust bearing, and each thrust bearing is engaged with an opening in the hollowed block. The resulting thrust bearing joint can operate at higher loads than conventional cross designs.

20 Claims, 5 Drawing Sheets

PRECISION THRUST BEARING JOINT

TECHNICAL FIELD

This invention relates in general to universal joints, such as for use in a vehicle driveshaft assembly. More specifically, this invention relates to an improved structure for a cross for a universal joint capable of withstanding high axial loads.

BACKGROUND OF THE INVENTION

In most land vehicles in use today, a drive train assembly is provided for transmitting rotational power from an output shaft of an transmission to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the transmission and a first end of the driveshaft tube, while a second universal joint is connected between a second end of the driveshaft tube and the input shaft of the axle assembly. The universal joints provide a rotational driving connection from the output shaft of the transmission through the driveshaft tube to the input shaft of the axle assembly, while accommodating a limited amount of angular misalignment between the rotational axes of these three shafts.

A typical universal joint includes a cross having a central body portion with four cylindrical trunnions extending outwardly therefrom. The trunnions are oriented in a single plane and extend at right angles relative to one another. A hollow cylindrical bearing cup having a cylindrical outside wall and a circular end wall is mounted on the end of each of the trunnions. A bearing structure, such as a plurality of needle bearings or roller bearings, is provided between the trunnion and the associated bearing cup to facilitate relative rotational movement therebetween. The bearing cups that are mounted on a first opposed pair of the trunnions can be connected to a first yoke secured to a first component of the drive train assembly, while the bearing cups mounted on a second opposed pair of the trunnions can be connected to a second yoke secured to a second component of the drive shaft assembly.

When the bearing cups are mounted on the associated trunnions, the circular end walls of the bearing cups are disposed adjacent to the axially outer ends of the trunnions and bearings. If the inner surfaces of these end walls directly contact the axially outer end surfaces of the trunnions during operation, friction caused by such direct contact can generate undesirable heat and wear. However, if the inner end surfaces of the bearing cups do not fit snugly against the axially outer end surfaces of the trunnions, relative axial movement between the bearing cups and the trunnions can cause imbalances and result in undesirable noise and vibrations. Thus, to address these situations, it is known to position a thrust washer between the inner end surface of the bearing cup and the axially outer end surface of the trunnion. A typical thrust washer is formed from a relatively low friction, wear resistant material, such as plastic, that can absorb the thrust loads that occur between the end of the trunnion and the bearing cap and take up any looseness therebetween.

A thrust washer can absorb some axial load and torque from the vehicle driveline such as that experienced under normal driving conditions. However, a typical Cardan universal joint is not equipped for handling high axial loads and torque. Under high thrust loads, the normal tolerance of a thrust washer will be exceeded, resulting in unacceptable vibrations in the vehicle driveline. In addition, excessive axial loads and torque may cause the ends of a typical cross to flex while placing unacceptable load and torque on the lug structures of the yoke. Thus, it would be desirable to provide an improved structure for a universal joint assembly that addresses these concerns.

SUMMARY OF THE INVENTION

A cross for a universal joint in a vehicle driveshaft assembly is comprised of a hollowed block of material having four openings. The hollowed block holds an inner cross that has a first cross member and a second cross member. Each cross member has an end portion that extends through a thrust bearing, and each thrust bearing is engaged with an opening in the hollowed block. The resulting universal joint can operate at higher loads than conventional cross designs.

According to this invention there is also provided a cross for a universal joint, suitable for use in a vehicle driveshaft assembly. The cross includes a hollowed block of material having two pairs of opposed openings normal to each other, and an inner cross positioned within the hollowed block. The inner cross has a first cross member and a second cross member positioned normal to each other, the first cross member extending through the first pair of hollowed block openings and the second cross member extending through the second pair of hollowed block openings. The cross members pass through a thrust bearing at each of the hollowed block openings, the thrust bearings are positioned within the openings.

According to this invention there is also provided a cross for a universal joint, suitable for use in a vehicle driveshaft assembly. The cross includes an inner cross having a first bore and a second bore formed therethrough, the first bore and second bore extending through the inner cross at right angles relative to one another. First and second bolts are threaded into opposing sides of the first bore, the first and second bolt securing a first pair of thrust bearings to the inner cross. A third bolt passes through the second bore, the third bolt having a nut to secure a second pair of thrust bearings to opposing sides of the second bore of the inner cross.

Various objects and advantages of this invention will become apparent to those skilled in the art from the following detailed description of the preferred embodiment, when read in light of the accompanying drawings.

DETAILED DESCRIPTION OF THE INVENTION

Figure 1:
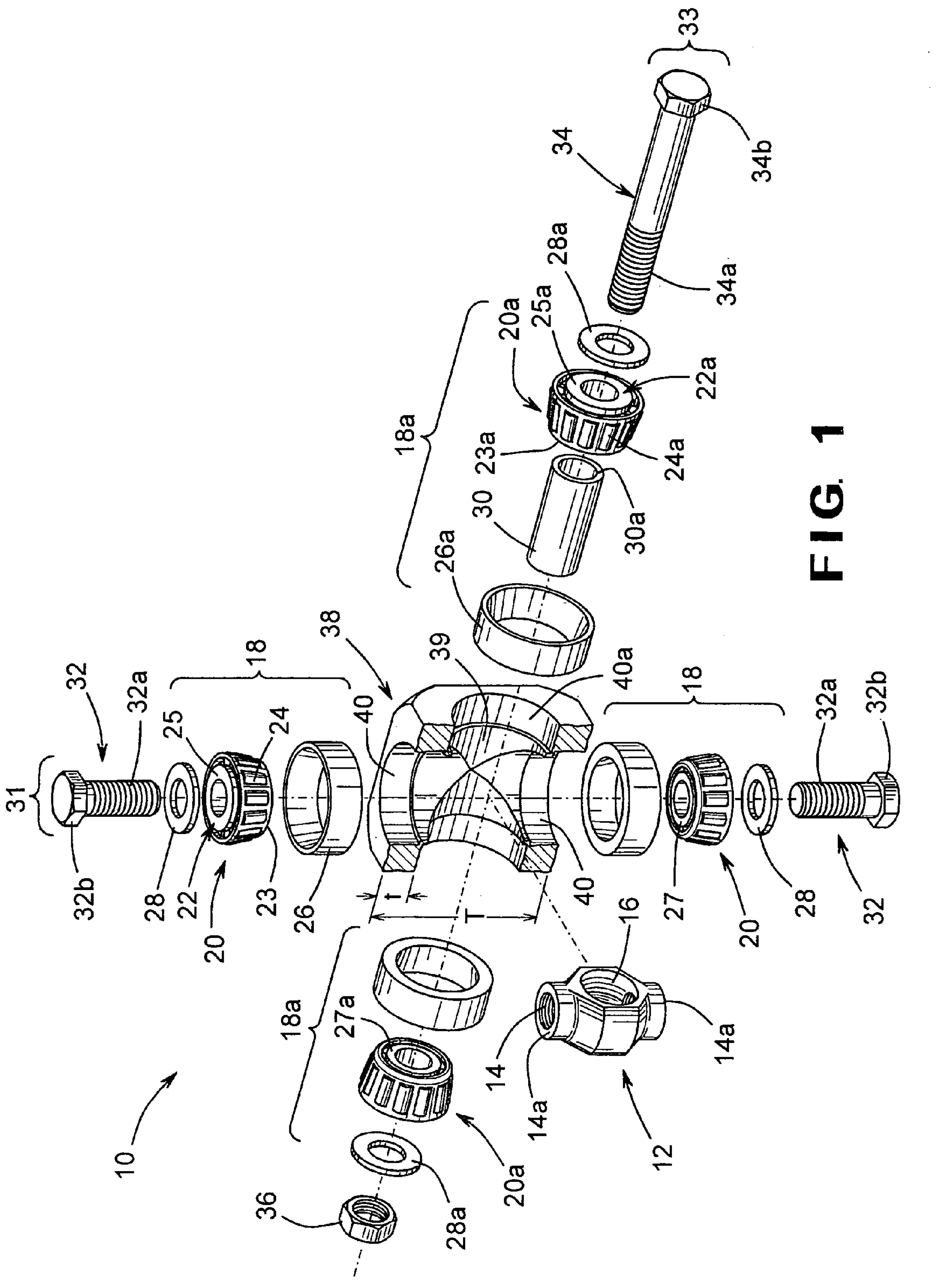
FIG. 1 is an exploded schematic view in perspective of a universal joint cross according to the invention with a sectional perspective view of the cross outer block.
Figure 5:
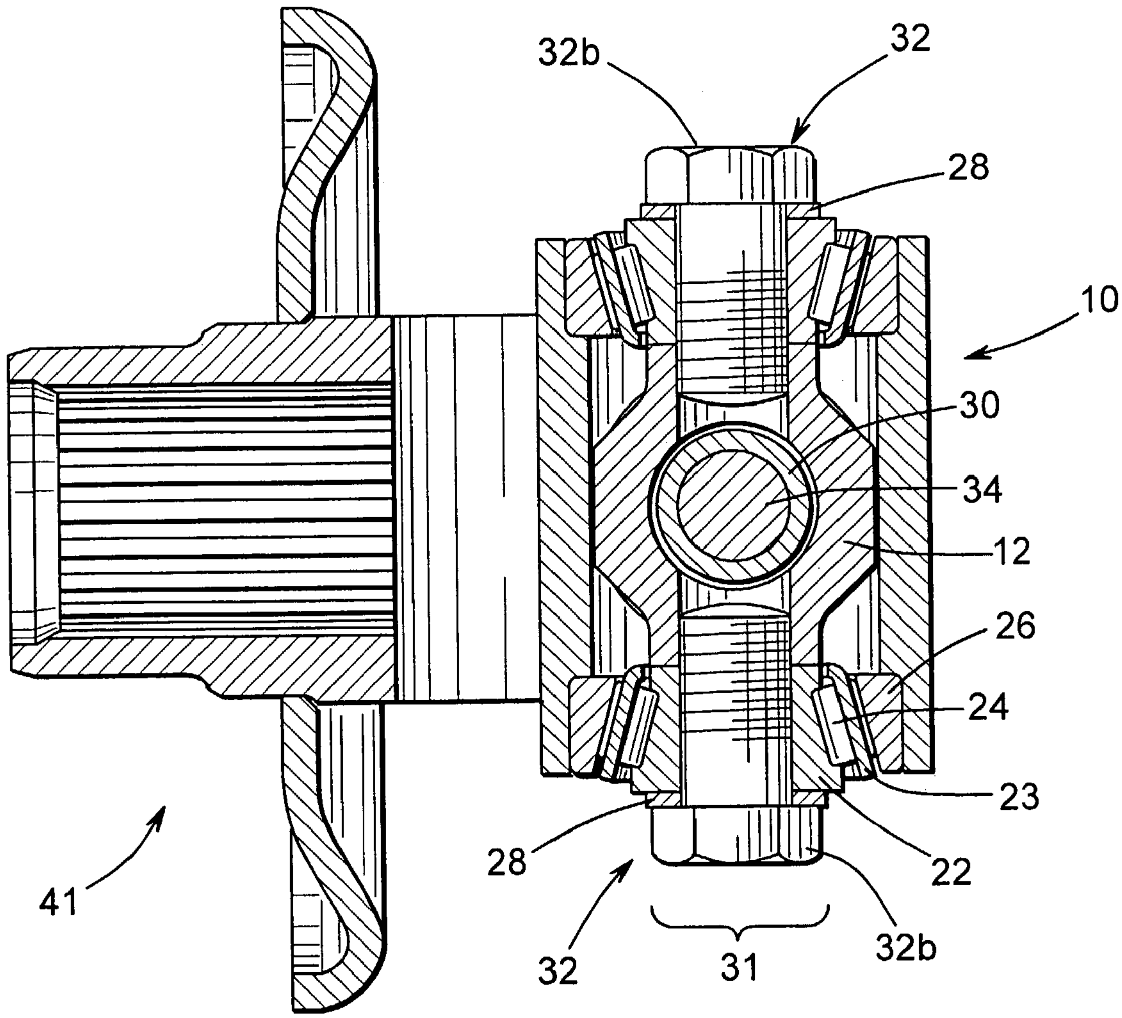
FIG. 5 is a second sectional elevation view of the universal cross and yoke is rotated 90 degrees from the view of FIG. 4.

Referring now to the drawings, there is illustrated in FIG. 1 a universal joint cross, indicated generally at 10, in accordance with this invention. The universal joint cross 10 includes an inner cross 12 having a first bore 14 and a second bore 16 formed therethrough. The bores 14 and 16 extend through the inner cross 12 at right angles relative to one another and intersect at the rotational center thereof. Thrust bearings 18 rest against the tapered end portions 14*a* of the first bore 14. Thrust bearings 18 are bearings designed to take axial load into the bearing along its rotating axis. The thrust bearings 18 are comprised of an annular bearing 20 having an inner race 22, a cage 23, and a plurality of cylindrically shaped rolling elements 24. The thrust bearings 18 also include an outer race 26 and a thrust washer 28. In the preferred embodiment, the diameter of the tapered end portions 14*a* of the first bore 14 is approximately the same as the diameter of the inner face 27 of the inner race 22 of annular bearing 20 so that the tapered end portion 14*a* pushes securely against the inner race 22. In addition, the thrust washer 28 in the preferred embodiment also has approximately the same diameter as the outer face 25 of the inner race 22. Although inner face 27 and outer face 25 may have approximately the same diameter, the inner face 27 may have a smaller diameter than the outer face 25 if the annular bearing 20 is a tapered bearing. Also, if the annular bearing 20 is a tapered annular bearing, as shown in the drawings, then the inner surface of the outer race 26 may be tapered (as best shown in FIG. 5) to receive the tapered annular bearing 20 therein.

Two thrust bearings 18*a* are also aligned with the second bore 16 of the inner cross 12. Thrust bearings 18*a* may be of the same shape and design as thrust bearings 18, but such is not necessary. The thrust bearings 18*a* are comprised of a annular bearing 20*a* having an inner race 22*a,* a cage 23*a,* and a plurality of cylindrically shaped rolling elements 24*a*. The thrust bearings 18*a* also include an outer race 26*a* and a thrust washer 28*a*.

In the preferred embodiment, a cylindrical sleeve 30 extends through the second bore 16. The cylindrical sleeve 30 is loosely positioned in the second bore 16 to allow for rotation. The sleeve 30 is slightly longer than the length of the second bore 16 to prevent contact between the inner face 27*a* of the inner race 22*a* and the body of the inner cross 12. The sleeve 30 also has a diameter that is approximately the same as the diameter of the inner face 27*a* of the inner race 22*a* so the sleeve end portions 30*a* fit securely against both inner races 22*a*. Although the preferred embodiment of FIG. 1 shows the use of a sleeve 30 at the second bore 16, the universal joint cross may be constructed without a sleeve 30 without departing from the scope of the invention.

A first cross member 31 is divided into two first cross member components 32. Each first cross member component 32 extends through a thrust bearing 18 and into the first bore 14 at opposing ends of the inner cross 12. In the preferred embodiment, the first cross member components 32 are threaded adapters, such as the bolts shown in FIG. 1. Each bolt 32 has a threaded portion 32*a* and a head portion 32*b*. The diameter of the threaded portion 32*a* of the first cross member components 32 is slightly less than the inside diameter of the thrust washer 28, while the head portion 32*b* of the first cross member components 32 is larger than the inside diameter of the thrust washer 28. Although the head portions 32*b* are shown with a hexagonal head in the figures, it should be recognized that the head portions 32*b* may be of any shape as long as they are larger than the inside diameter of the thrust washers 28.

When the first cross member components 32 are threaded into opposing ends of the first bore 14, the head portion 32*b* secures the thrust washers 28 and inner races 22 of the thrust bearings 18 against the end portions 14*a* of the inner cross 12. The length of the first cross member components 32 is such that the threaded portion 32*a* extends only partially into the body of the inner cross 12 so the components 32 do not block the second bore 16, thus allowing a second cross member 33 to extend through the second bore 16 in a manner that allows for a limited amount of rotation between the first cross member 31 and the second cross member 33 during operation of the universal joint.

The second cross member 33 extends through a thrust bearing 18*a* on either side of the second bore 16. In the preferred embodiment, the second cross member 33 is comprised of a threaded adapter or bolt 34 having a threaded portion 34*a* and a head portion 34*b*. The threaded portion 34*a* of the bolt 34 has a diameter slightly less than the inside diameter of the thrust washer 28*a* while the head portion 34*b* is larger than the inside diameter of the thrust washer 28*a*. Although the head portion 34*b* is shown as a hexagonal head in the figures, it should be recognized that the head portion 32*b* may be of any shape as long as it is larger than the inside diameter of the thrust washers 28*a*. Since the bores 14 and 16 extend through the inner cross 12 at right angles relative to one another, the first cross member 31 and the second cross member 33 are positioned normal to each other.

The length of the bolt 34 is such that the threaded portion 34*a* extends completely through the body of the inner cross 12 so a threaded nut 36 may be secured at the opposing side. In passing through the body of the inner cross 12, the second cross member 33 passes through the two thrust bearings 18*a* located on opposing sides of second bore 16. The second cross member 33 also passes through the cylindrical sleeve 30 which is rotatably mounted within the second bore 16. When the threaded nut 36 is tightened onto the threaded portion 34*a* of the bolt 34, the threaded nut 36 and head portion 34*b* push the opposing thrust washers 28*a* against the outer faces 25*a* of the inner races 22*a* of the thrust bearings 18*a*. Thus, the inner races 22*a* are pushed against the end portions 30*a* of the cylindrical sleeve 30.

Although the preferred embodiment of FIG. 1 shows the second cross member 33 being comprised of a single threaded adapter 34 and nut 36 tightened against a rotatable cylindrical sleeve 30, it should be recognized that other similar embodiments may be used without departing from the scope of the invention. For example, the second cross member 33 could instead be constructed using two threaded adapters that thread into opposing ends of sleeve 30.

The universal joint cross 10 includes a block 38 having an interior or hollowed portion 39 and two opposed pairs of openings 40 and 40*a*. The opposed pairs of openings 40 and 40*a* are located normal or at right angles relative to one another to correspond with the first cross member 31 and the second cross member 33, respectively. The openings 40 and 40*a* are sized to respectively receive the outer races 26 and 26*a* of thrust bearings 18 and 18*a*.

The block 38 is preferably constructed of a strong, durable material such as hardened steel. The wall thickness t of the block 38 is preferably at least 10 percent of the maximum dimension T of the block 38. Although the block 38 is shown with a cubical shape, the block 38 may have many shapes without departing from the scope of the invention, as will be shown below. The block 38 may be constructed in half sections as shown in FIG. 1 to facilitate installation of the inner cross 12, with the half sections later assembled by conventional means such as welding or bolting.

Figure 2:
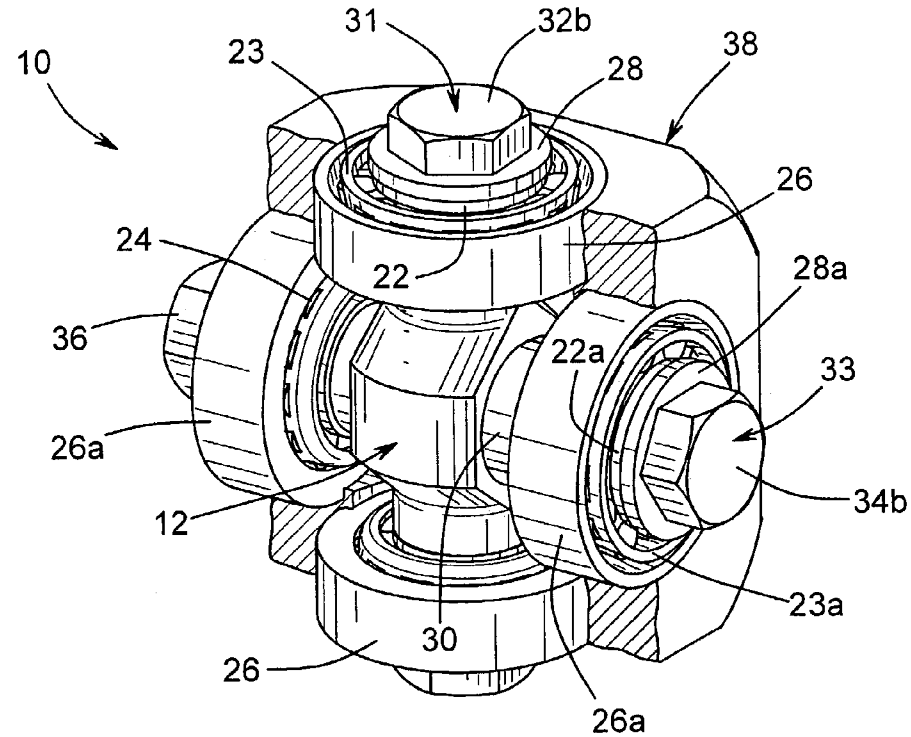
FIG. 2 is a schematic perspective view of a universal joint cross according to the invention with a sectional perspective view of the cross outer block.
Figure 3:
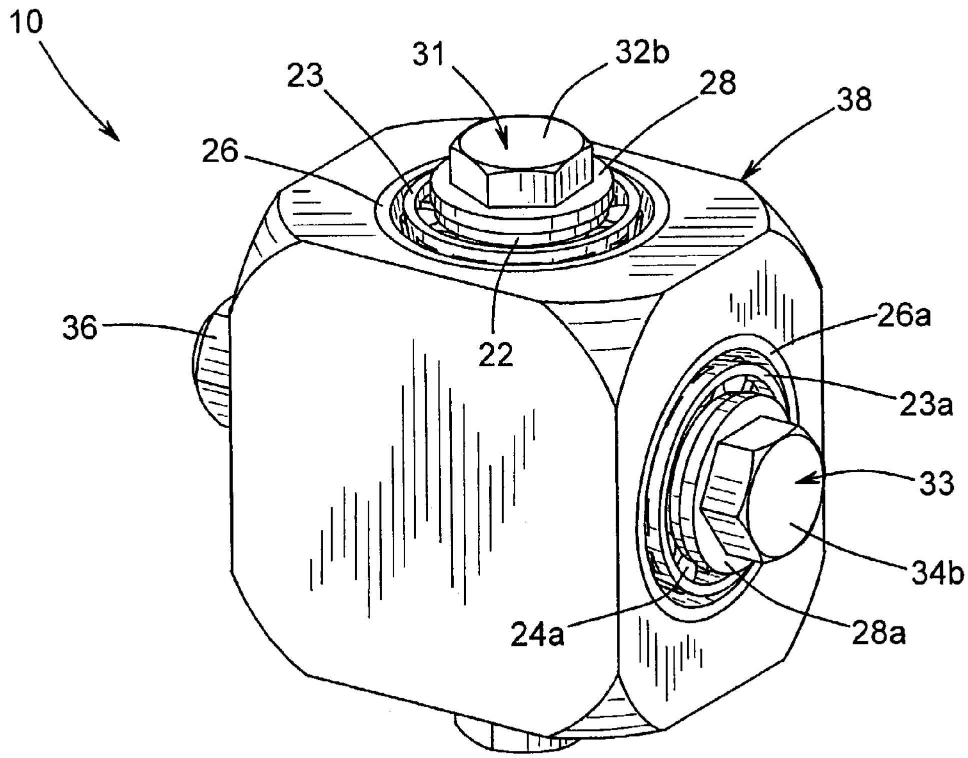
FIG. 3 is a schematic perspective view of the universal joint cross in FIG. 2 including the complete cross outer block.

As is best shown in FIGS. 2 and 3, the head portions 32*b* of first cross member 31 each extend through thrust bearings 18, while thrust bearings 18 are positioned within the openings 40. The thrust bearings can be retained within the openings 40 by the geometry of the structure, by press fitting, or by any other suitable means. Thus, when torque is transferred through the universal joint cross 10 at the first cross member 31, the torque is transmitted through the thrust bearings 18 to the outer block 38, thereby preventing undesirable deflections or vibrations in the first cross member 31. The head portions 32*b* are shown compressed against the thrust washers 28 in FIGS. 2 and 3, which is a position in which the components may be shipped prior to attachment to a conventional yoke. This position will change when the cross 10 is attached to a conventional yoke to form a universal joint, as will be explained below.

Similar to the first cross member 31, the second cross member 33 has head portions 34*b* that extend through thrust bearings 18*a*. Each thrust bearing 18*a* is positioned and retained by the geometry of openings 40*a*, preferably by press fitting. Thus, when torque is transferred between the universal joint 10 and the second cross member 33, the torque is transmitted through the thrust bearings 18*a* to the outer block 38, thereby preventing undesirable deflections in the second cross member 33. The head portion 34*b* and nut 36 are shown compressed against the thrust washers 28*a* in FIGS. 2 and 3, which is a position in which the components may be shipped prior to attachment to a conventional yoke. This position will change when the cross 10 is attached to a conventional yoke to form a universal joint, as explained below.

Figure 4:
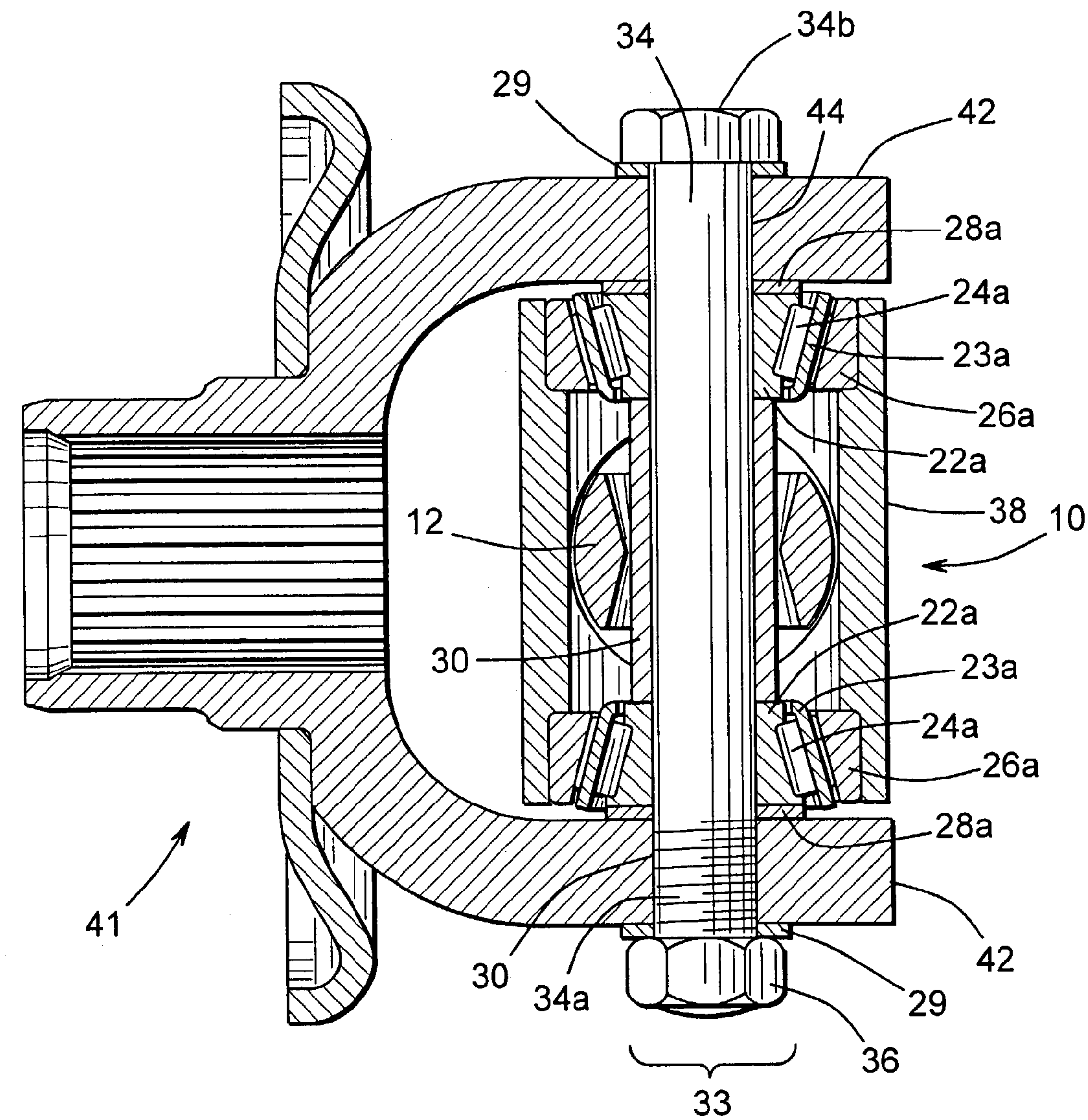
FIG. 4 is sectional elevation view of a universal joint cross and yoke in accordance with the invention.

FIG. 4 shows the universal joint cross 10 engaged with a yoke 41. Although the yoke 41 is shown as an end yoke, the yoke may be any conventional type of yoke secured to a driving or driven member (not shown) by any conventional means, such as by welding, adhesives, bolting, or slip joint. The end yoke includes arms 42 with lug openings 44 in the arms 42 to receive either the first cross member 31 or second cross member 33. In FIG. 4, the second cross member 33 passes through the lug openings 44 of the yoke arms 42. When the cross 10 is engaged with the yoke arms 42, an additional washer 29 may be placed between the head portion 34*b* and one of the yoke arms 42, and another washer 29 may be placed between the nut 36 and a second yoke arm 42, as shown in FIG. 4. If yoke 41 is rotating as a driven member in FIG. 4, then yoke 41 transfers torque to second cross member 33, and the load is then applied through the block 38 to the first cross member 31 at thrust bearings 18. The first cross member 31 then further applies the torque to a driven member (not shown).

FIG. 5 shows the universal joint of FIG. 4 from an alternate sectional view to show the portion of the cross 10 that would engage with a driven member (not shown). The head portions 32*b* of the bolts 32 are shown compressed against thrust bearing 28 in FIG. 5, which is a position in which the universal joint cross 10 might be shipped prior to installation. However, when a driven yoke (not shown) is attached to the first cross member 31, the bolts 32 would be loosened to secure a yoke arm to the first cross member 31 in a manner similar to that shown in FIG. 4. When the driven yoke (not shown) is engaged with the first cross member 31, additional washers 29 may also be placed between the head portions 32*b* and the arms of the driven yoke.

Figure 6:
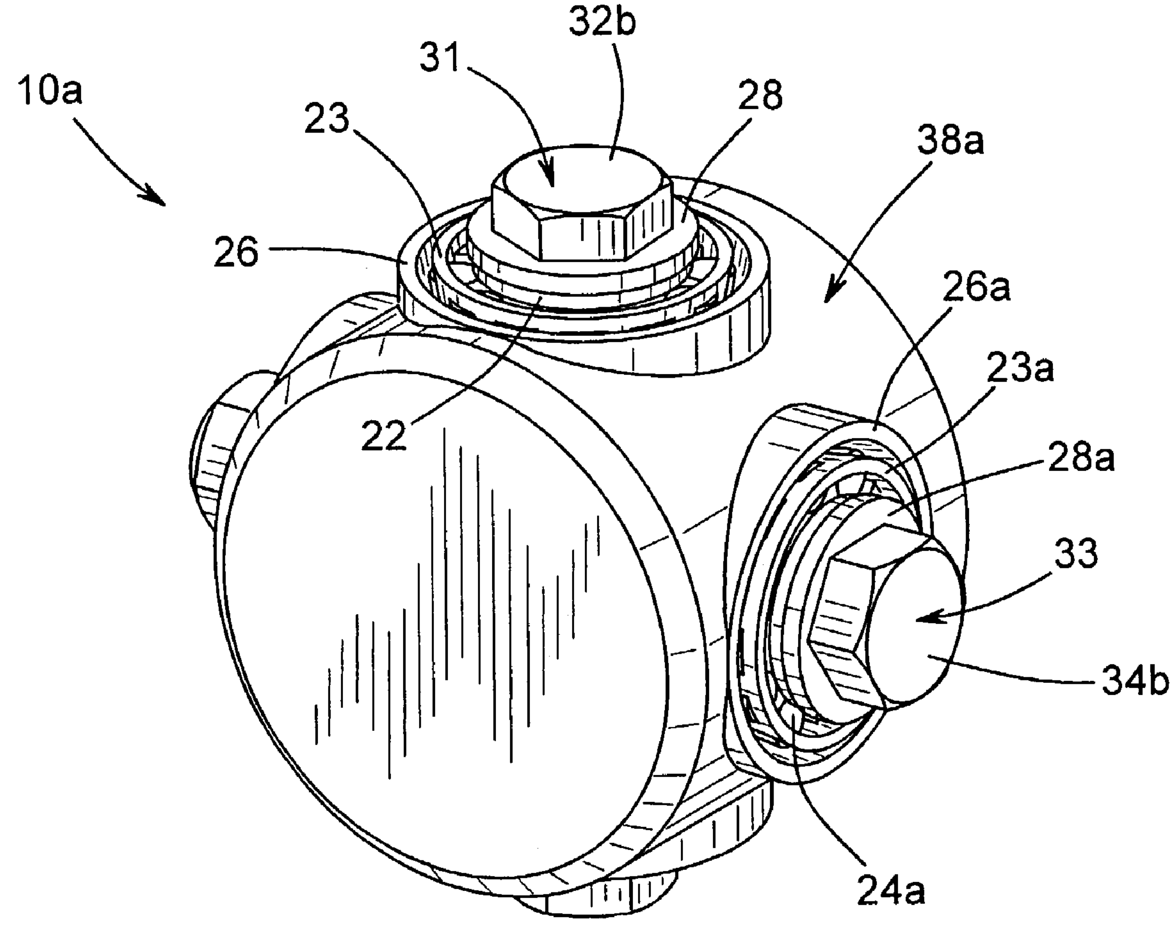
FIG. 6 is a schematic perspective view of an alternative embodiment of a universal joint cross according to the invention.

As previously mentioned, the block 38 surrounding the inner cross 12 may take on many shapes other than cubical. One such embodiment of a universal joint cross 10*a* of the invention is shown in FIG. 6 where the block 38*a* is shown with an approximately cylindrical shape. Other possible shapes for the block may include a spherical or multi-sided block, but are not limited to such.

The principle and mode of operation of this invention have been described in its preferred embodiments. However, it should be noted that this invention may be practiced otherwise than as specifically illustrated and described without departing from its scope.

What is claimed is:

1. A cross for a universal joint comprising:
- a block having an interior, a first pair of openings, and a second pair of openings;
- an inner cross disposed within said interior of said block, said inner cross having a first bore that is aligned with said first pair of openings in said block and a second bore that is aligned with said second pair of openings in said block;
- a pair of first cross member components, each of said first cross member components extending through one of said first pair of openings of said block into engagement with said first bore of said inner cross; and
- a second cross member extending through said second pair of openings of said block and through said second bore of said inner cross.

2. The cross defined in claim 1 wherein said first bore of said inner cross is threaded, and wherein said pair of first cross member components extends into threaded engagement with said threaded first bore of said inner cross.

3. The cross defined in claim 2 wherein said pair of first cross member components is a pair of bolts.

4. The cross defined in claim 1 wherein said second cross member is a bolt.

5. The cross defined in claim 1 further including a pair of thrust bearings that are respectively disposed in said first pair of openings of said block and engage said inner cross.

6. The cross defined in claim 1 further including a pair of thrust bearings that are respectively disposed in said second pair of openings of said block and engage a sleeve extending therebetween.

7. The cross defined in claim 1 further including a first pair of thrust bearings that are respectively disposed in said first pair of openings of said block and engage said inner cross and a second pair of thrust bearings that are respectively disposed in said second pair of openings of said block and engage a sleeve extending therebetween.

8. The cross defined in claim 7 wherein said first bore of said inner cross is threaded, and wherein said pair of first cross member components extends into threaded engagement with said threaded first bore of said inner cross.

9. The cross defined in claim 8 wherein said pair of first cross member components is a pair of bolts.

10. The cross defined in claim 7 wherein said second cross member is a bolt.

11. A universal joint comprising:
- a first yoke;
- a second yoke; and
- a cross connecting said first and second yokes, said cross including: a block having an interior, a first pair of openings, and a second pair of openings; an inner cross disposed within said interior of said block, said inner cross having a first bore that is aligned with said first pair of openings in said block and a second bore that is aligned with said second pair of openings in said block; a pair of first cross member components connected to said first yoke, each of said first cross member components extending through one of said first pair of openings of said block into engagement with said first bore of said inner cross; and a second cross member connected to said second yoke and extending through said second pair of openings of said block and through said second bore of said inner cross.

12. The universal joint defined in claim 11 wherein said first bore of said inner cross is threaded, and wherein said pair of first cross member components extends into threaded engagement with said threaded first bore of said inner cross.

13. The universal joint defined in claim 12 wherein said pair of first cross member components is a pair of bolts.

14. The universal joint defined in claim 11 wherein said second cross member is a bolt.

15. The universal joint defined in claim 11 further including a pair of thrust bearings that are respectively disposed in said first pair of openings of said block and engage said inner cross.

16. The universal joint defined in claim 11 further including a pair of thrust bearings that are respectively disposed in said second pair of openings of said block and engage a sleeve extending therebetween.

17. The universal joint defined in claim 11 further including a first pair of thrust bearings that are respectively disposed in said first pair of openings of said block and engage said inner cross and a second pair of thrust bearings that are respectively disposed in said second pair of openings of said block and engage a sleeve extending therebetween.

18. The universal joint defined in claim 17 wherein said first bore of said inner cross is threaded, and wherein said pair of first cross member components extends into threaded engagement with said threaded first bore of said inner cross.

19. The universal joint defined in claim 18 wherein said pair of first cross member components is a pair of bolts.

20. The universal joint defined in claim 17 wherein said second cross member is a bolt.

* * * * *